No. 808,338. PATENTED DEC. 26, 1905.
E. BURKE.
PAPER MACHINE PRESS ROLL.
APPLICATION FILED JULY 27, 1904.

WITNESSES:
Marion Richards.
Lauren M. Sanborn.

INVENTOR:
Edmund Burke,
by Clifford Verrill & Clifford,
Attorneys.

UNITED STATES PATENT OFFICE.

EDMUND BURKE, OF BERLIN, NEW HAMPSHIRE.

PAPER-MACHINE PRESS-ROLL.

No. 808,338.  Specification of Letters Patent.  Patented Dec. 26, 1905.

Application filed July 27, 1904. Serial No. 218,321.

*To all whom it may concern:*

Be it known that I, EDMUND BURKE, a citizen of the United States, residing at Berlin, in the county of Coos and State of New Hampshire, have invented a new and useful Improvement in Press-Rolls for Paper-Machines, of which the following is a specification.

My invention relates to improvements in press-rolls for paper-machines.

It consists in forming the rolls of a series of wooden sections arranged radially and means for bonding the sections together. It is of the utmost importance that the periphery of the press-rolls should be perfectly smooth and without appreciable joints.

Figure 1:
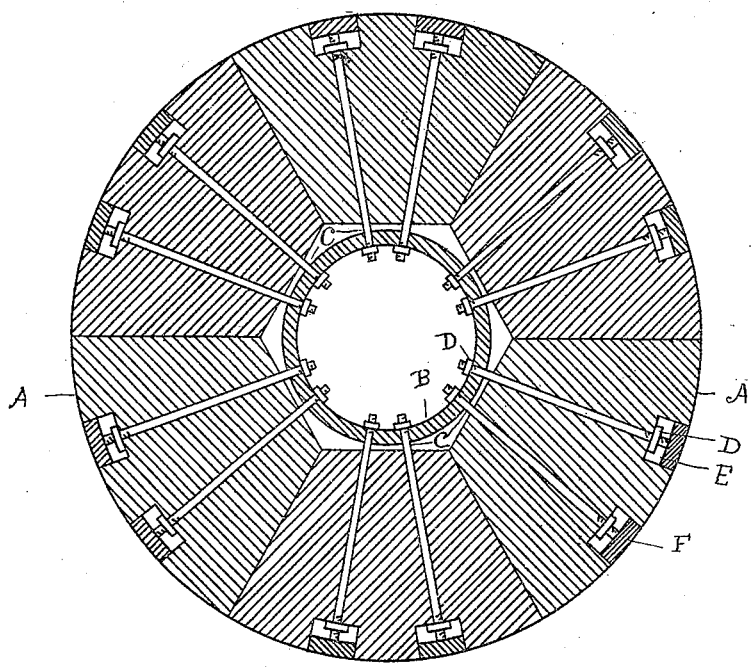
Figure 2:
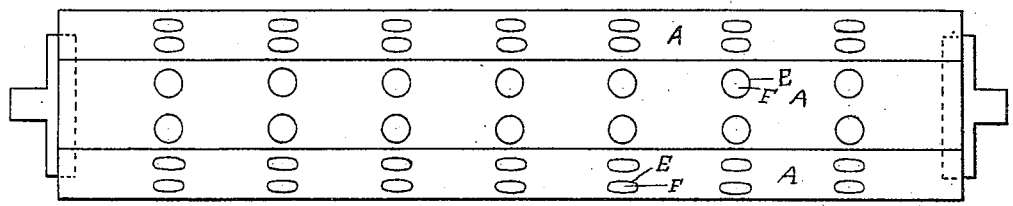

In the drawings herewith accompanying and making a part of this application, Figure 1 is a transverse sectional view taken on a line passing through one of the bonding-rings, and Fig. 2 is a plan view of the roll.

Same letters of reference refer to like parts.

In said drawings, A represents a series of truncated wooden sections tapering inwardly in transverse section. As here shown, the roll is composed of six sections. These sections are held together by means of one or more rings or keepers B positioned within the open space formed by the removal of the tapering ends of the sections, the periphery of the ring or keeper being spaced apart from the sections so as to permit the sections to have movement toward a common center without engaging the periphery of the ring. This enables the sections to be drawn toward the common center until the contacting faces make a tight joint. The sections are adapted to be held together and to be drawn toward the common center until perfect contact of the engaging faces is effected by means of bond or rods C, passing radially through the keepers into the wooden sections. For convenience the bonds are threaded and are provided with nuts D on each end, whereby the sections can be drawn tightly together by setting the nuts. The sections are provided with recesses E to receive the outer ends and nuts of the bonds, and when the nuts are set on the bonds the sections are in turn drawn as tightly together as possible. The recesses are then filled with wooden inserts F. The rolls thus formed are then turned in a lathe to a perfect cylindrical form, and when thus turned the rolls are substantially homogeneous, the joining of the sections being so perfect that the surface of the roll is practically unbroken.

While I have shown the roll as composed of six sections, each section being provided with two bonds for each keeper, I do not intend to be limited in these respects; but any press-roll made of a series of sections grouped as shown and means for holding the sections together in such way that the sections can be drawn tightly together by the bonds is within the spirit and scope of my invention.

Having thus described my invention and its use, I claim—

1. A paper-machine press-roll consisting of a series of tapering wooden sections arranged radially, keepers positioned within and spaced apart from the inner ends of said sections and means for drawing the sections each independently of the other together toward a common center.

2. A paper-machine press-roll consisting of a series of tapering wooden sections, a series of circular keepers centrally positioned relative to said sections and spaced apart therefrom and a series of bonds connecting the sections with said keepers each of said sections being free to be drawn toward a common center independently of the others.

3. A paper-machine press-roll consisting of a keeper a series of tapering wooden sections arranged radially around said keeper, and spaced apart therefrom, a series of bonds connecting the sections with said keeper and means for adjusting the bonds to draw the sections together, each section being free to be drawn toward a common center independently of the other.

4. A paper-machine press-roll consisting of a series of tapering wooden sections, a keeper centrally positioned relative to said sections and spaced apart therefrom and a series of bonds passing through said sections and engaging said keeper each section being free to be drawn toward a common center independently of the other, the ends of the bonds being countersunk and covered with wooden inserts whereby the surface of the roll is homogeneous.

In testimony whereof I have signed my name to this specification, in presence of two subscribing witnesses, this 9th day of July, 1904.

EDMUND BURKE.

In presence of—
E. T. BAILEY,
W. E. CHURCHILL.